United States Patent Office 3,444,042
Patented May 13, 1969

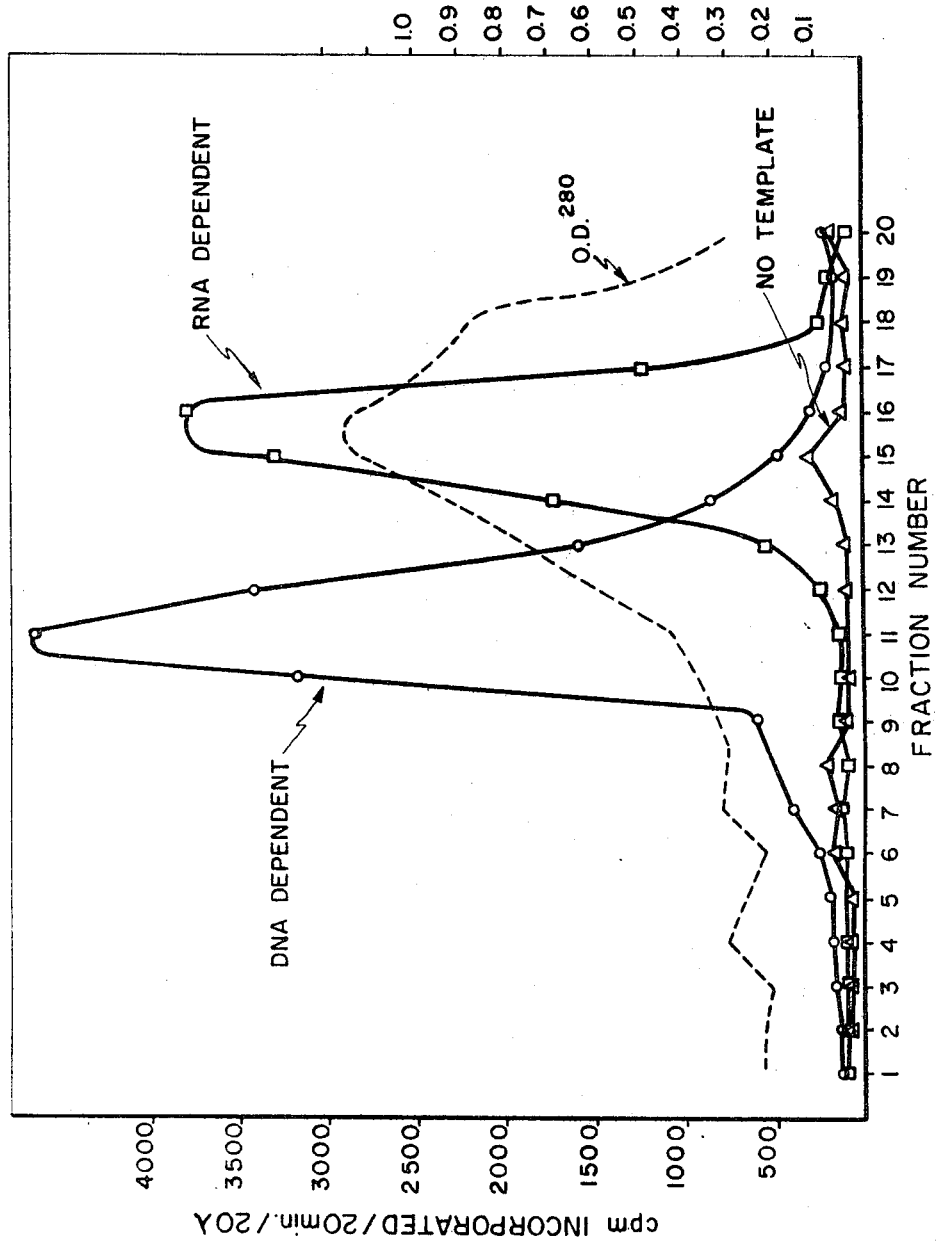

3,444,042
PURIFIED REPLICASES AND THEIR USES
Solomon Spiegelman and Ichiro Haruna, Champaign, and Norman R. Pace, Urbana, Ill., assignors to University of Illinois Foundation, Urbana, Ill., a corporation of Illinois
Filed June 23, 1966, Ser. No. 559,933
Int. Cl. C08b 19/00; C12k 1/10; C12d 13/10
U.S. Cl. 195—28
17 Claims

ABSTRACT OF THE DISCLOSURE

Biologically active nucleic acids are synthesized in vitro from nucleotide bases and a purified replicase free of detectable destructive contaminants and substantially free of viral infectivity.

Figure 1:
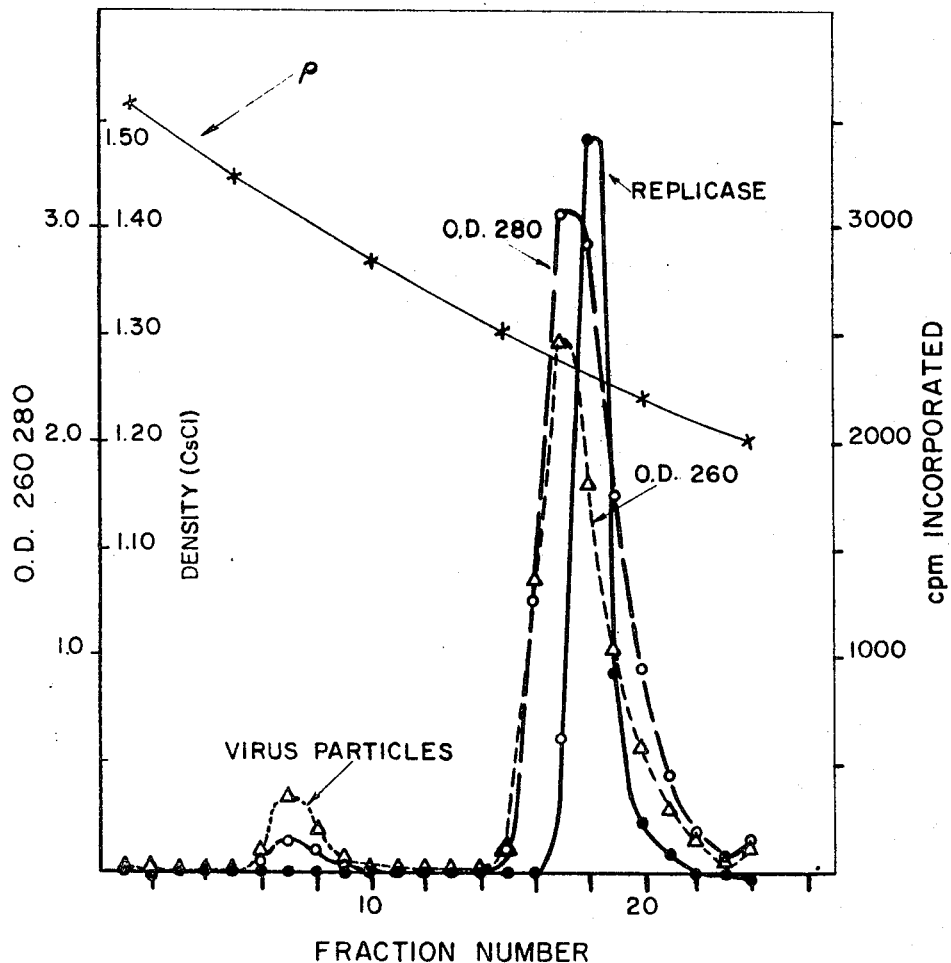

A United States Government contract or grant from or by the Public Health Service supported at least some of the work set forth herein.

This invention relates to methods and systems useful in the synthesis in vitro of biologically active nucleic acids and the isolation of such biologically active nucleic acids, the preparation of purified enzymic components of these systems, the resulting purified enzymic components which are effectively free of detectable levels of degrading enzymes and enzyme inhibitors, and substantially free of infective viral particles and enzyme inhibitors, and the biologically active nucleic acids produced therewith.

As used herein, the term "biologically active" includes the basis for the assay procedure described, infra, namely, the production of infectious viral RNA, and, more generally, includes materials that possess genetically competent characteristics or information essential to life or processes thereof. These biologically active materials are genetically competent and can transmit information to a system that will follow their instructions and translate them into biological sense.

Living organisms, including humans, animals, plants, and microorganisms, use biologically active nucleic acids in the processes of storing and transmitting translatable genetic or hereditary information or messages and in the synthesis of the large number of tissue and body proteins. Two nucleic acids which can function under proper conditions as transmitters of the genetic code are DNA (deoxyribonucleic acid) and RNA (ribonucleic acid). In the living organism, these nucleic acids are generally combined with proteins to form nucleo-proteins.

These DNA and RNA molecules consist of comparatively simple constituent nucleotides (nitrogen base, pentose sugar moiety, and phosphate groups) polymerized into chains containing hundreds to thousands of these nucleotide units generally linked together through chemical bonds formed between the constituent phosphate and sugar groups.

These nitrogen bases are classified as purines or pyrimidines. The pentose sugar is either ribose or deoxyribose. Phosphoric acid groups are common to both DNA and RNA. On complete hydrolysis, DNA and RNA yield the following compounds:

| DNA | RNA |
|---|---|
| Adenine (A) | Adenine (A) |
| Cytosine (C) | Cytosine (C) |
| Guanine (G) | Guanine (G) |
| Thymine (T) | Uracil (U) |
| Methylcytosine | |
| Hydroxymethylcytosine | |
| Deoxyribose | Ribose |
| Phosphoric acid | Phosphoric acid |

It should be noted that the bases adenine (A), cytosine (C), and guanine (G) are comon to both DNA and RNA; the base thymine (T) of DNA is completely replaced by the base uracil (U) in RNA. Methylcytosine occurs in small amounts in various deoxyribonucleic acids of animal origin and in wheat germ. In the DNA of several bacteriophages, cytosine is completely replaced by hydroxymethylcytosine.

Hydrolysis of these nucleic acids under appropriate conditions liberates a group of compounds known as nucleotides; these nucleotides consist of a purine or pyrimidine bases linked to pentose sugar moiety, which sugar moiety is esterified with phosphoric acid. These nucleotides are the subunits from which polymeric nucleic acids are constructed.

The ribonucleic acid polynucleotide structure may be represented diagrammatically, for example, as follows:

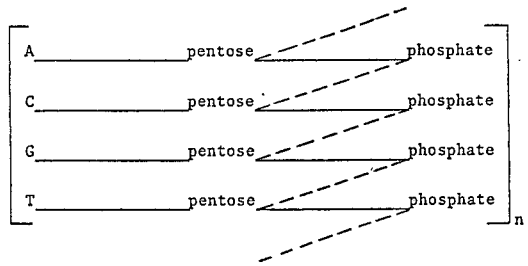

The dotted lines above represent ester groupings between one of the free hydroxyl groups of the pentose and of the phosphate groups. The subscript $n$ represents the number of repeating units which constitute the particular ribonucleic acid molecule.

Recent studies by chemists have shown that the DNA molecule has a doubly stranded chain which, when shown in three dimensions, has two chains intertwined in a double helix. Each chain consists of alternating nucleotides, there being ten nucleotides in each chain per rotation of the helix, this ten nucleotide chain being about 34 A. in length. Both chains are right handed helices. These helices are evidently held together by hydrogen bonds formed between the hydrogen, nitrogen, and oxygen atoms in the respective chains. The structure of the DNA molecule as it relates to the sequence of these bases in the molecule is now being elucidated; these structural studies are important, since it is now generally believed that this sequence of bases is the code by means of which the DNA molecule conveys or transmits its genetic information.

Chemists have shown that RNA generally is a single-stranded structure that has in its backbone the 5-carbon sugar ribose instead of the 5-carbon deoxyribose sugar found in DNA. As in DNA, the different nucleotides are linked together through the phosphate groups to form a long chain and thus to form an RNA molecule of high molecular weight. The RNA molecules do not seem to be as highly polymerized as the DNA molecules, and although there is evidence of hydrogen bonding between the RNA bases in some viruses (e.g., reovirus), it is thought that no helical structure is involved. As with DNA, base sequence studies are now being made with RNA.

In genes, the repository of hereditary factors of living cells and viruses, specific genetic information resides in the nucleotide sequence appearing in the DNA and RNA molecules. These sequences are transmitted, encoded and reproduced in vivo by the complex enzymic systems present in living organisms. If no modification of the genetic DNA or RNA takes place, an exact duplicate or replicate of the nucleotide sequence is produced; this newly formed RNA or DNA in turn results in the production in vivo of an exact duplicate or replicate of a particular protein molecule. If, however, a change takes place in the DNA or RNA molecules, which change can be mediated by some mechanism such as radiation, a foreign chemical reactant, etc., a "mutation" takes place wherein the altered DNA or RNA molecules duplicate or replicate the "new" DNA or RNA and these in turn produce new or altered proteins as dictated by the altered nucleotide structure.

Copending application Ser. No. 535,596, filed Mar. 18, 1966, which is a continuation of application Ser. No. 509,458, filed Sept. 29, 1965, now abandoned, discloses a method and controlled system for synthesizing in vitro biologically active nucleic acids using an initiating amount of intact, biologically active (genetically competent) nucleic acid template, replicase and the requisite nucleotides. With this method, one may synthesize, for example, a ribonucleic acid molecule (RNA) identical with the intact template continuously over extended periods until or unless one arbitrarily or selectively stops the synthesis. This self-replication involves the true and complete transmission and translation from the intact template to the nucleotides, whereby the nucleotides are assembled structurally in the identical sequence that characterizes the intact template. The intact product synthesized may be either selectively labeled (e.g., radioactive) or nonlabeled and be in a form that is free of detectable impurities or other materials with which it is otherwise found in nature.

More specifically, application Ser. No. 535,596, now pending, discloses a controlled system that provides for the synthesis of intact, biologically active nucleic acid in a buffered aqueous in vitro enzymatic system from nucleotide bases using a selected, intact, biologically active nucleic acid free of detectable levels of destructive material as a template (e.g., input template). When the system produces biologically active "replicas" (identical copies of the same molecular weight) of the nucleic acid template, the process is referred to as one involving "replication." The enzyme catalyst may be referred to as a "polymerase" or "replicase"; when the enzyme catalyst is an RNA-dependent RNA-polymerase, it is defined as a "replicase."

The process or system of the pending application is particularly well suited for synthesizing in vitro biologically active ribonucleic acid (RNA) from ribonucleotide base components (substrates) having high bond energy, using an intact, homologous (contains the information for its specific replicase) biologically active RNA template, a homologous replicase that selectively recognizes the structural program or message of the template, has catalytic activity for the synthesis of intact biologically active RNA from ribonucleotides, and is effectively free of detectable levels of ribonuclease activity and detectable levels of other destructive enzymological activity, and using divalent ions ($Mg^{++}$) as a cofactor. The replication process may be stopped by a number of procedures, the simplest of which involves the cooling of the reaction to a temperature at which the rate of enzymic activity becomes negligible, e.g., 0° C.

The replicase for viral RNA can be obtained either by introducing a selected virus nucleic acid (e.g., bacteriophage) free of any existing protective proteinaceous coat into an uninfected host bacterium cell to synthesize an enzyme which is thought not to preexist in the host cell, or, preferably, by introducing an intact bacteriophage (virus particle) into the bacterium cell to synthesize this enzyme.

The injected or intruding viral RNA has a structural program that defines a message that is translated into enzyme protein and is conserved during this translation. This enzyme, a homologous replicase (RNA-dependent RNA-polymerase), is isolated from the altered cell and is then purified to remove detectable levels of the usual concurrent ribonuclease activity and other destructive and confounding enzymological activity which is found in the bacterial cell.

The resulting partially purified enzyme, replicase, discriminately recognizes the intact homologous RNA genome of its original and requires it as a template for normal synthetic replication. Thus, the replicase exhibits a unique and selective dependence on and preference for its homologous viral RNA in exhibiting viral RNA-polymerizing (synthesizing and/or replicating) activity. The replicase exhibits the unique and valuable ability to provide the replication of only intact viral RNA and does not provide for the replication of fragments or foreign sequences or incomplete copies of its own genome. The term "genome" refers to the entire complement of genes in a cell. The genes provide a repository of genetic information for living cells and viruses.

The nucleotide bases or substrate components for viral RNA replication should have sufficiently high bond energy for replication. Satisfactory replication of viral RNA has been achieved with four riboside triphosphates, namely, adenosine triphosphate (ATP), guanosine triphosphate (GTP), cytidine triphosphate (CTP), and uridine triphosphate (UTP).

In replicating infectious viral RNA in vitro, the pending application discloses purifying two different RNA replicases induced in a mutant Hfr strain of *Escherichia coli* (Q–13) by two serologically distinct RNA bacteriophages. The enzyme protein preparations were effectively free of detectable levels of interfering ribonuclease, phosphorylase, and DNA-dependent RNA-polymerase (transcriptase). These isolated enzymes (replicases) showed both a mandatory requirement for template RNA and an ability to mediate prolonged and extensive net synthesis of biologically active polyribonucleotide (RNA). The two replicases exhibited a unique discriminating selectivity in their response to added RNA. Under otherwise optimal conditions, both replicases were virtually inactive with heterologous RNA templates, including ribosomal and s-RNA of the host.

The replicase preparations described in further detail below and constituting a part of the instant invention, are substantially free of detectable levels of virus particles and infectious RNA. In addition, the replicase may be purified so as to be substantially free of contaminants such as carbohydrates, lipids, polynucleotides and other proteins.

The purified biologically active RNA polymerase (replicase), which is substantially free of detectable levels of viral infectivity, and the infective RNA produced with our system and method are intact and are free of impurities or materials with which they are otherwise found in Nature. The synthesized viral RNA, for example, is free of the normally occurring protein coating present in the intact viral particle. The controlled RNA product produced with our system and method thus offers the advantage of being useful in experimental, laboratory, and commercial activities where one wishes to use a biologically active RNA that is effectively free of detectable confounding or extraneous materials. Our controlled system also is free of detectable confounding or extraneous materials and thus provides an important means for studying the mechanism by which genetic changes and replication occur in life's processes and a means of understanding, modifying or changing such processes or mechanisms.

On a practical basis, the availability of our relatively pure replicase will allow the investigator to move into research areas not previously accessible. Thus, we can now proceed to determine such things as the effect of small or large changes in the replicase molecule upon its ability to synthesize RNA, and to determine the change in the biological activity of the RNA so produced by the altered replicase.

Being a protein and, therefore, made up of a series of amino acids, the structure of the replicase can now be studied, and the relation of its structure to the structure of the RNA produced can give important information, vis-a-vis, structure-activity relationships. Since the replicase is a large molecule and subject to varying degrees of hydrolysis by chemical or enzymatic means, it will be of interest to determine the effect of such hydrolysis, whether they be comparatively minor or major, upon the biological activity of the molecule remaining. In addition, the protein molecule can be subjected to varying degrees of chemical change such as acetylation of its reactive amino or hydroxyl groups, halogenation, nitration, or sulfonation; reaction with nitrous acid should convert the free amino groups of the protein to hydroxyl groups, again with some change in activity.

An RNA template of an in vitro replicating system may be formed in situ. If one were, for example, to introduce foreign bases or nucleotides (e.g., analogues of known bases or nucleotides) into our replicating system, a mutant may be formed which would be the biologically active template for replication with those same bases or nucleotides; in such instances, one would be synthesizing mutants in vitro in a known way.

Our discovery of a method to produce a purified biologically active RNA-dependent RNA-polymerase substantially free of detectable levels of viral infectivity and other biologically inactive contaminants should be useful in the study and/or preparation of products with antiviral activity, anticancer activity, and hormone and/or enzyme activity. Research directed toward the preparation of such products could lead to important therapeutic advancements.

It is conceivable to project that an altered replicase might under certain conditions produce an altered RNA which in our system might possibly have altered virus properties or, under ideal circumstances, might have antivirus properties. It may be possible to use this system by perhaps adding a new component to the bacteria-pure, RNA-virus system, which will result in a new replicase, which replicase system can be directed to produce antiviral molecules.

Using the fractionation system discussed below, a purified replicase preparation is isolated. It is known that disease causing viruses commonly include RNA molecules; for example, the viruses which cause tobacco and tomato mosaic disease, poliomyelitis, influenza, Newcastle disease in poultry, and mumps, among others, are ribonucleic acid (RNA) containing proteins. Our discovery points to the possibility that replicases for each of these RNA viruses could be derived from an appropriate system. The isolation in vitro of such replicases in purified form provides means for the study of the biochemistry of the diseases and in the preparation of vaccines.

With a pure replicase in hand, it is possible to determine its particular amino acid structure. In addition, with the pure RNA in hand, it should be possible to determine the nucleotide sequence in the RNA, as well as its other structural characteristics. Determination of amino acid structure and coding to give the particular RNA nucleotide sequence should be of importance in elucidating amino acid and nucleotide sequence correlation.

The intact viral RNA used by us as initiating template is isolated from purified virus. It is obtained by deproteinizing the RNA with phenol and purifying the RNA on sucrose gradients. It is not obtained from the virus-infected bacteria but from the complete virus particle.

The replicases were obtained by introducing viral RNA into an isolated mutant Hfr strain of $E.$ $coli$ (Q–13).

Using the in vitro system as herein referred to, the template was produced, for example, by a factor of $10^{14}$. That is, for each molecule of intact template there are synthesized $10^{14}$ replicas. Further, 5 micrograms (e.g., $3 \times 10^{12}$ strands) of synthesized viral RNA are made every 20 minutes per 0.25 ml. of reaction mixture.

The in vitro serial transfer experiments in the pending application, which established that the newly synthesized RNA is a self-propagating and biologically competent entity, requires infectivity assays of the reaction mixtures. A technical complication is introduced by the presence of viable virus particles in the replicase preparations. Their chemical contribution to the RNA content is trivial compared to the amounts synthesized. However, because they have a far greater infective efficiency than free RNA, even moderate contamination with intact particles cannot be tolerated in material either being assayed for infectious RNA or being used as material for injection into a host. To obviate these difficulties, all synthesized products are purified with phenol and checked for whole virus particles prior to measurement of infectivity. This, however, makes the assay both laborious and cumbersome, precluding its focile use in laboratory studies or as a therapeutic agent.

Separation of virus particles from the viral replicase can be achieved by taking advantage of their disparities in size and density. The $Q\beta$ virus [J. Bacteriol., 91, 442 (1966)] has a molecular weight of $4.2 \times 10^6$ and a density of 1.43 gm./cm.$^3$. It was unlikely that the replicase would be as large or as dense. Successful purification of the replicase by size and density generates more than the convenience of eliminating virus particles. The same procedure also removes free RNA, replicase complexed to postulated "replicative forms" [cf. Fed. Proceed., 23, 1285 (1964)].

There is described below the further purification of $Q\beta$-replicase by banding in CsCl gradients followed by zonal centrifugation in linear gradients of sucrose. The resulting enzyme is substantially free of virus particles and behaves as a single component in the fractionation procedures. Its molecular weight (110,000) and density (1.26) precludes association with so-called "replicative forms" or "negative" strands. Its ability to respond to $Q\beta$-RNA by synthesizing infectious copies remains unaltered. The data discourage invoking a cryptic functioning of pre-existent RNA (double- or single-stranded) in the reaction being studied.

At this point of the purification process, while the enzyme (replicase) is substantially free of contaminating phage particles and other enzymes, contamination by other biologically inactive materials still exists. The percentage of enzyme (based upon measurements of activity) in the product at this point is in the range of about 0.05% to 0.5% by weight. Further purification of the enzyme by removal of nonenzymatic biologically inactive materials is achieved by using one or more of the following procedures: (1) absorption on C$\gamma$ alumina (aluminum hydroxide gel); (2) isoelectric precipitation; (3) ammonium sulfate fractionation; and (4) adsorption and elution from DEAE cellulose. Such purified preparation retain in their entirety the characteristics of the replicating enzyme, which basic characteristics are summarized below.

The replicase preparations of this invention include the following characteristics:

(1) The replicase preparation is free of detectable levels of contaminating enzymes such as RNAase, phosphorylase, and DNA-dependent RNA-polymerase;

(2) The replicase preparation is free of significant levels of viral infectivity; it is, therefore, essentially noninfectious and carries no significant concentration of contaminating RNA molecules with it;

(3) When sufficient purification has been conducted to achieve a substantially purified replicase preparation as described above, the replicase has had removed from it substantial amounts of biologically inactive contaminants;

(4) The replicase requires its homologous RNA as a template;

(5) In the presence of this template, the requisite nucleotides, $Mg^{++}$, and aqueous buffer, the replicase mediates prolonged and extensive synthesis of the RNA.

The replicase preparations of this invention, unlike those described in said copending application, have the characteristics of (2) and (3), above.

When the replicase is isolated from a bacteriophage infected cell the reaction is characterized further by these properties: (1) the enzyme generates a polynucleotide (RNA) of the same molecular weight as the viral RNA; (2) when reactions are initiated with RNA template at concentrations below saturation of the replicase, autocatalytic synthesis of the RNA is observed in the system; (3) the RNA isolated from this reaction system and further purified can, in turn, serve with full effectiveness as a template; (4) the RNA produced by the enzyme in this system is biologically active, being as fully competent as the original or template RNA to program the synthesis of virus particles in protoplasts.

In the following example, there is described in detail a procedure for the purification of the RNA-dependent RNA-polymerase (replicase) obtained from a bacteriophage infected cell. The example is illustrative of our invention. It will be understood, however, that the invention is not necessarily limited to the particular examples, tests, materials, properties, conditions and procedures described therein.

EXAMPLE

(A) Methods and materials

Catalase (2× crystallized) was purchased from Sigma Chemical Co., and assayed as described in J. Biol. Chem., 236, 1372 (1964). CsCl was the 99.7% pure material from Penn Rare Metals, Inc., Revere, Pa. An unsatisfactorily high O.D.$^{260}$ was easily corrected by filtration through a cellulose nitrate membrane filter (Schleicher and Schuell and Co., B–6, 27 mm.).

The host and assay organism is a mutant Hfr strain of *E. coli* (Q–13) isolated in the laboratory of W. Gilbert of the Department of Biology, Harvard University, Cambridge, Mass., by Diana Vargo, formerly an assistant of Dr. Gilbert, now a graduate student of the Department of Microbiology, University of Illinois, Urbana, Ill. It has the convenient property of lacking ribonuclease I and RNA phosphorylase [Fed. Proc., 24, 293 (1965)]. Preparation of virus stocks and purified RNA followed the methods of Doi and Spiegelman in Proc. Nat'l. Acad. Sci., U.S., 49, 353–360 (1963).

(B) Assay of enzyme activity by incorporation of radioactive nucleotides

The standard reaction volume is 0.25 ml. and unless specified differently contains the following in $\mu$moles: tris HCl pH 7.4, 21; magnesium chloride, 3.2 (when included, manganese chloride, 0.2); CTP, ATP, UTP, and GTP, 0.2 each. The enzyme is usually assayed at a level of 40 $\mu$g. of protein in the presence of 1 $\mu$g. of RNA template. The standard reaction is run for 20 minutes at 35° C. and terminated in an ice bath by the addition of 0.15 ml. of neutralized saturated pyrophosphate, 0.15 ml. of neutralized saturated orthophosphate, and 0.1 ml. of 80% trichloracetic acid. The precipitate is transferred to a membrane filter and washed seven times with 5 ml. of cold 10% TCA. The membrane is then dried and counted in a liquid scintillation counter as described in Proc. Nat'l. Acad. Sci., U.S., 50, 905–911 (1963). This washing procedure brings zero time counts to less than 80 c.p.m. with input counts of 1×10$^6$ c.p.m. The specific activities of the labeled triphosphates added are adjusted so that with the efficiency employed, 1×10$^6$ c.p.m. corresponds to 0.2 $\mu$moles of the corresponding triphosphate.

(C) Preparation of infected cells

The basic medium employed for growing infected cells and producing virus contained the following in grams per liter: NH$_4$Cl, 1; MgSO$_4$·7H$_2$O, 0.06; gelatin 1×10$^{-5}$; cas- amino acids (vitamin free), 15; glycerol, 30; to this is added, after separate autoclaving, 7 ml. of 0.1 M CaCl$_2$ and 10 ml. containing 4 gm. of Na$_2$HPO$_4$·7H$_2$O and 0.9 gm. KH$_2$PO$_4$. Lysates in liter quantities are first prepared to be used for infection of larger volumes of cell suspensions. These are obtained by infecting log phase cultures (OD$_{660}$ of 0.25) with a purified phage preparation at a multiplicity of about 5. They are incubated while shaking at 37° C. until lysis is complete and then monitored for titer and purity of the phage. Such lysates can be stored frozen at −17° C. indefinitely and thawed just prior to use. In general, 35 liter quantities of cells are grown up in carboys to an OD$_{660}$ of between 0.275 and 0.290. The temperature in the carboys is 34° C. while the temperature of the water bath in which they are immersed is maintained at 37° C. When the cells reach an OD$_{660}$ of 0.275, they are infected with virus at a multiplicity of between 10 and 50 and allowed to aerate for mixing for one minute. The areation is interrupted for 10 minutes for absorption, reinstituted, and the incubation continued. At 25 minutes sufficient sucrose and magnesium are added to give final concentrations of 18% and 0.01 M respectively. After another 5 minutes the process is terminated by the addition of crushed ice. The infected cells are harvested in a Sharples Centrifuge and stored at −14° C., at which temperature ability to yield active enzyme is retained for periods exceeding 6 months. Uninfected cells are prepared and stored in the same manner. To provide uniform preparations for enzyme isolation, the infected cells are thawed sometime prior to use and resuspended (20 grams of packed cells in 100 ml.) in a solution containing 0.01 M tirs buffer pH 7.4, 0.001 M MgCl$_2$ and 0.0005 M mercaptoethanol and 5 $\mu$g./ml. of DNAase (deoxyribonuclease). After thorough resuspension with a magnetic stirrer at 4° C., the suspension is divided into convenient aliquots in plastic tubes, frozen, and stored at −14° C.

(D) Preparation of enzyme

The following procedure is described for 20 grams of packed infected cells. The frozen cell suspension (120 ml.) is thawed and to this is added 0.5 mg./ml. of lysozyme following which the mixture is frozen and thawed twice, using methanol and Dry Ice as the freezing mixture. To the lysate are added 0.9 ml. of 1 M MgCl$_2$ and 2.5 $\mu$g./ml. DNAase (deoxyribonuclease) and the resulting mixture is incubated for 10 minutes in an ice bath. The extract is then centrifuged for 20 minutes at 30,000×g. and the supernate removed. The pellet is transferred to a prechilled mortar, ground for 5 minutes, and then resuspended in 30 ml. of the same buffer as used for the cell suspension except that the magnesium concentration is raised to 0.01 M to increase the effectiveness of the DNAase digestion. The extract is then centrifuged at 30,000×g. for 20 minutes and the two supernates combined, adjusted to 0.01 M EDTA, ethylene diamine tetraacetic acid (previously brought to pH 7.4), and incubated at 0° C. for 5 minutes. Insoluble proteins appear and are removed by centrifugation at 30,000×g. for 20 minutes. At this stage, a typical active infected extract has an OD$_{260}$ of between 150 and 180. Lower values commonly signal a poor infection with a resulting low yield of enzyme. To the cleared supernatant fluid is added 0.01 mg. of protamine sulfate for each OD$_{260}$ unit. After 10 minutes the precipitate, containing virtually all the enzyme activity, is collected by centrifugation at 12,000×g. for 10 minutes. It is dissolved in 12 ml. of "standard buffer" (0.01 M tris buffer, pH 7.4; 0.005 M MgCl$_2$; 0.0005 M mercaptoethanol), adjusted to 0.4 M (NH$_4$)$_2$SO$_4$, and allowed to stand overnight at 0° C. This period of waiting is important for the subsequent fractionation since complete disaggregation was found to be essential for acceptable separation of the replicase from transcriptase ("transcriptase" is the transcribing enzyme which employs DNA as a template to synthesize complementary RNA and is also known as DNA-dependent RNA-polymerase). The extract is diluted with 24 ml. of standard buffer, and after 20 minutes, is centrifuged at for 20 minutes and for each 40 ml. of supernatant are added 12 ml. of a 0.5% solution of protamine sulfate. The precipitate which forms contains virtually all of the DNA-dependent RNA-polymerase along with an RNA-independent RNA-polymerizing activity. The RNA replicase remains in the supernatant and begins to show good dependence on added RNA. (This is one of the critical steps in the fractionation and any variation in host, medium, time or temperature of infection modifies the amount of protamine required to achieve separation. It is often safer to titrate small aliquots and determine the amount of protamine needed by appropriate assays.) After 10 minutes the precipitate is removed by centrifugation at $$12,000 \times g.$$

for 10 minutes. To the resulting supernate is added an equal volume of saturated ammonium sulfate (saturated at 0° C. and adjusted to pH 7.0 with ammonium hydroxide). After 10 minutes at 0° C. the precipitate is collected by centrifugation at 12,000×g. for 10 minutes and dissolved in 4 ml. of standard buffer containing 0.4 M ammonium sulfate. The resulting solution is then dialyzed against one liter of standard buffer for 1.5 hours. The dialyzed fraction is adjusted to 0.05 M ammonium sulfate with standard buffer and passed through a DEAE-cellulose column (1.2×10 cm.) which is washed with 100 ml. of standard buffer just prior to use. After loading the protein, the column is washed with 40 ml. of standard buffer containing 0.12 M NaCl which removes protamine, a poly-A synthetase [J. Biol. Chem., 237, 3786–3793 (1962)] and residual K-dependent ribonuclease. The enzyme is then eluted with 35 ml. of standard buffer containing 0.20 M NaCl. To fractions possessing enzyme activity, saturated ammonium sulfate is added to make the final solution 10% saturation. At this stage, the enzyme preparation has an $OD_{280}/OD_{260}$ ratio of 1.35 and usually contains 1 mg. of protein per ml. Under the ionic conditions specified, no loss in activity is observed over a month of storage at 0° C.

(E) *Centrifugation in CsCl*

One ml. of 10% ammonium sulfate in standard buffer (0.1 M tris, pH 7.4; .005 M $MgCl_2$; .0005 M 2-mercaptoethanol) containing 10–15 mg. of post-DEAE enzyme protein is layered over 4 ml. of CsCl solution adjusted to a density of 1.40 gm./cm.$^3$. The tube is centrifuged at 0° C. for 24 hours in the Spinco SW–39 rotor at 39,000 r.p.m. After centrifugation, the tube is pierced through the side immediately below the visible protein band, and the fractions collected through a 20 gauge hypodermic needle. The needle is bent in a right angle to permit insertion with the long arm up, following which the latter is rotated through 180° to permit the contents to emerge. The lower portion of the tube is then removed by piercing the bottom and collecting fractions. In this manner, contamination of the protein band by the virus band is minimal due to the significant differences in the densities of the two materials. Fractions are then diluted to 1 ml. with 10% ammonium sulfate in standard buffer for optical density measurements and enzyme assays.

(F) *Sedimentation through sucrose gradients*

The peak tubes from the enzyme regions of CsCl gradients are pooled and precipitated from 50% saturated ammonium sulfate. The precipitate is dispersed in standard buffer to a protein concentration of 25–30 mg./ml. and the suspension dialyzed for 2 hours against 250 ml. standard buffer at 0° C. Between 0.2 and 0.3 ml. of the dialyzed protein solution is layered onto a 5.4 ml. 5% to 20% linear gradient of sucrose dissolved in standard buffer. When a reference protein is desired, 100γ of catalase is included in each 0.2 ml. of protein solution. Gradients are centrifuged at 0° C. for 12–15 hours at 39,000 r.p.m. in the Spinco SW–39 rotor. Again, to avoid contamination with pelleted virus particles and other materials, the enzyme region is collected from the side as described for CsCl centrifugation. Aliquots are removed from each sample for O.D. measurements and enzyme assays. To avoid dilution inactivation, tubes containing replicase activity are not diluted; aliquots are removed for dilution and O.D. determination. Peak activity tubes are pooled and are used without further treatment. It should be noted that to avoid drastic loss of activity, the purification through sucrose gradients must be done with adequate amounts of protein, not less than 4 mg. per tube.

Purification procedures preliminary to centrifugal purification have been utilized. These procedures involve techniques such as ammonium sulfate fractionation, adsorption and elution from alumina Cγ and DEAE cellulose, chromotography on hydroxylapatite gel, isoelectric precipitation, and electrophoresis.

(G) *Assay for infectious RNA*

Protoplasts are prepared by a modification of the method of Guthrie and Sinsheimer [Biochem. Biophys. Acta., 72, 290 (1963)] and Strauss [J. Med. Biol., 10, 442 (1963)]. *E. coli* K12–W6, supplied by Dr. R. L. Sinsheimer of California Institute of Technology, is grown on 50 ml. 3×D medium [J. Biol. Chem., 205, 291 (1953)] to a cell density of $5 \times 10^8$/ml., and harvested by centrifugation at 3,000 r.p.m. for ten minutes at room temperature. The cell pellet is thoroughly drained, and is then dispersed in .35 ml. of 1.5 M sucrose; .17 ml. bovine serum albumin (Armour, 30%); .04 ml. 2 mg./ml. lysozyme (Armour) dissolved in 0.25 M tris, pH 8.1. The resulting suspension is allowed to stand for two minutes at room temperature, during which time any remaining pellet is thoroughly resuspended, then .05 ml. of 4% EDTA (neutralized to pH 7.4 with NaOH) are added. After 30 seconds further, 10 ml. of PAM (1% casamino acids, Difco; 1% nutrient broth, Difco; .1% glucose; 10% sucrose; .2% $MgSO_4$, the latter added after autoclaving) are added.

Protoplast preparations are stored at 2° C., and used up to five days after preparation. Efficiency of infection by viral RNA reaches a maximum in two or three days after preparation of the protoplasts and remains stable for at least five days. Routine plating efficiencies achieved are in the range $10^{-7}$ to $10^{-6}$ infectious units per strand of input viral RNA. In assaying replicate products for infectivity, aliquots from reaction mixtures are diluted in .01 M tris, pH 7.4; .005 M $MgCl_2$ to an RNA concentration of 0.2 to 0.8 γ/ml. (as defined by counts incorporated during synthesis). 0.2 ml. of the diluted reaction mixture are brought to 35° C., and 0.2 ml. of protoplast suspension at room temperature are added. After 30 seconds at 35° C., the mixture is diluted five-fold with PAM broth, incubated at 35° C. for a further 10 minutes and then plated. The indicator organism is *E. coli* K38, supplied by Dr. N. Zinder of Rockefeller University. Plates are incubated at 34° C.

After the initial fractionation on DEAE cellulose [at page 581 of Proc. Nat'l. Acad. Sci., U.S., 54, 579 (1965)], replicase preparations contain from $10^9$ to $10^{12}$ plaque-forming particles per mg. of protein. To permit direct assay of reaction mixtures for infectious RNA requires reduction of virus particle content by factors of $10^{10}$. Initial separation of protein and virus by density is achieved by equilibrium centrifugation in CsCl density gradients. Residual virus particles are removed by sedimentation in sucrose gradients.

Figure 2:
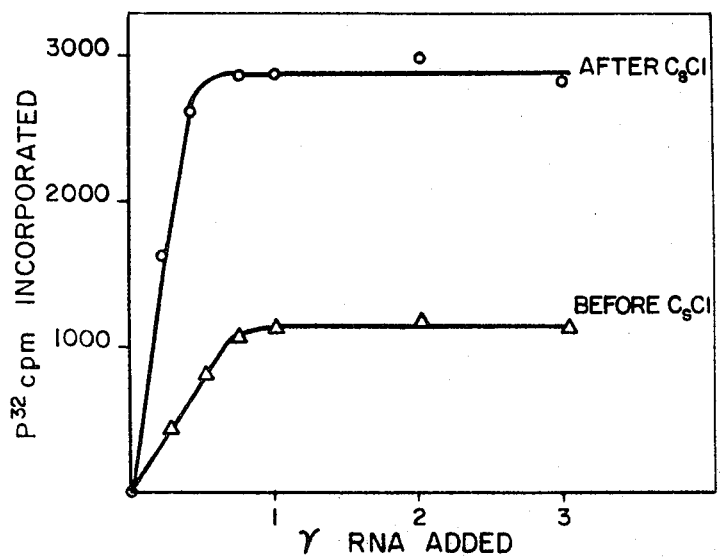
Figure 3:
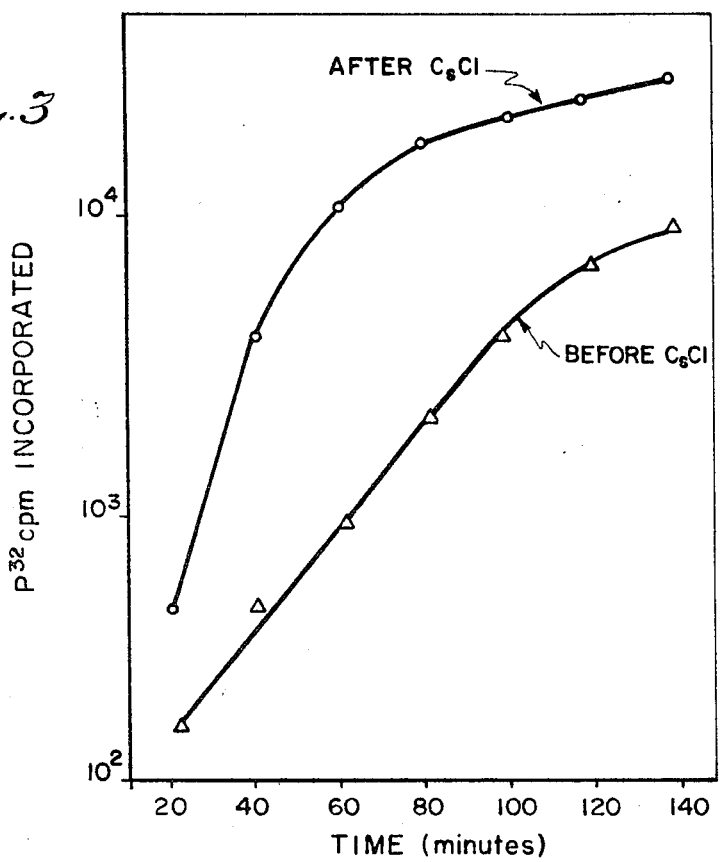
Figure 4A:
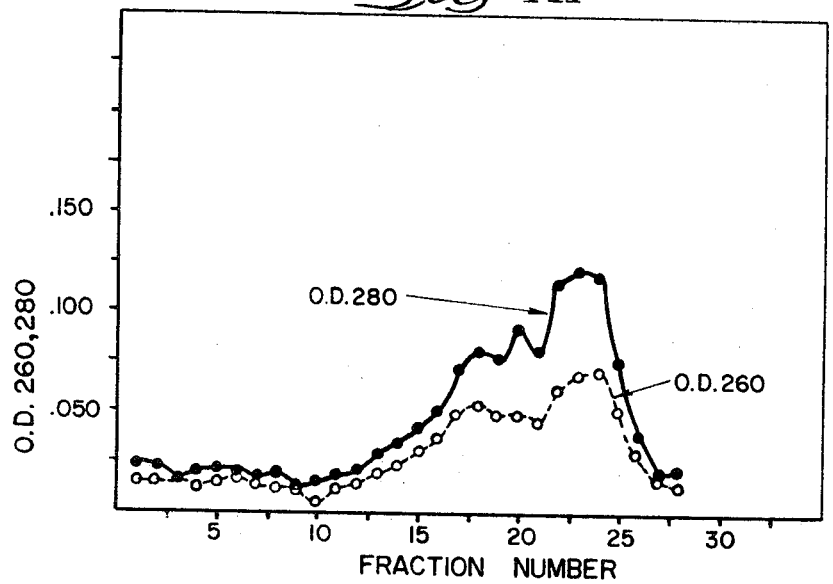
Figure 4B:
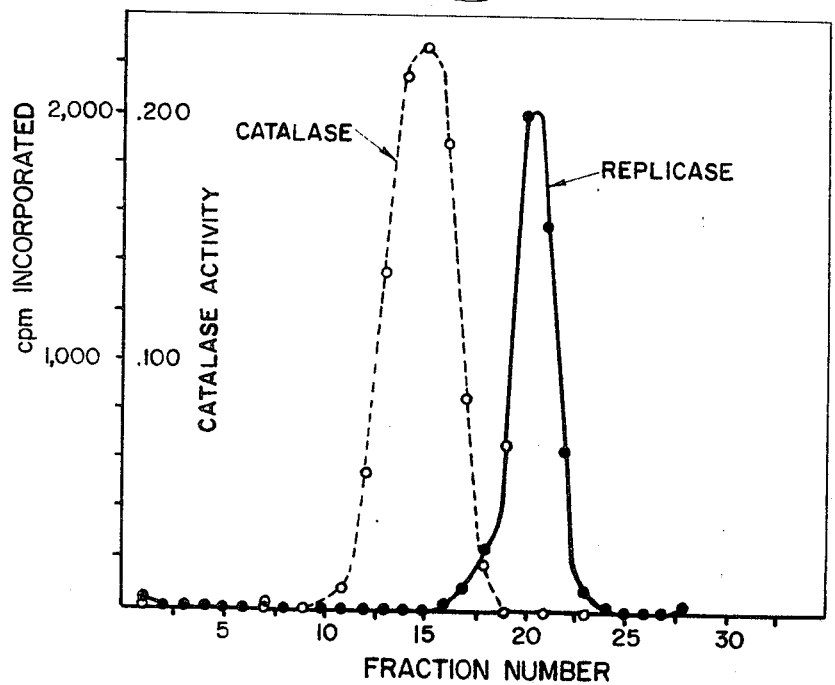
Figure 6:
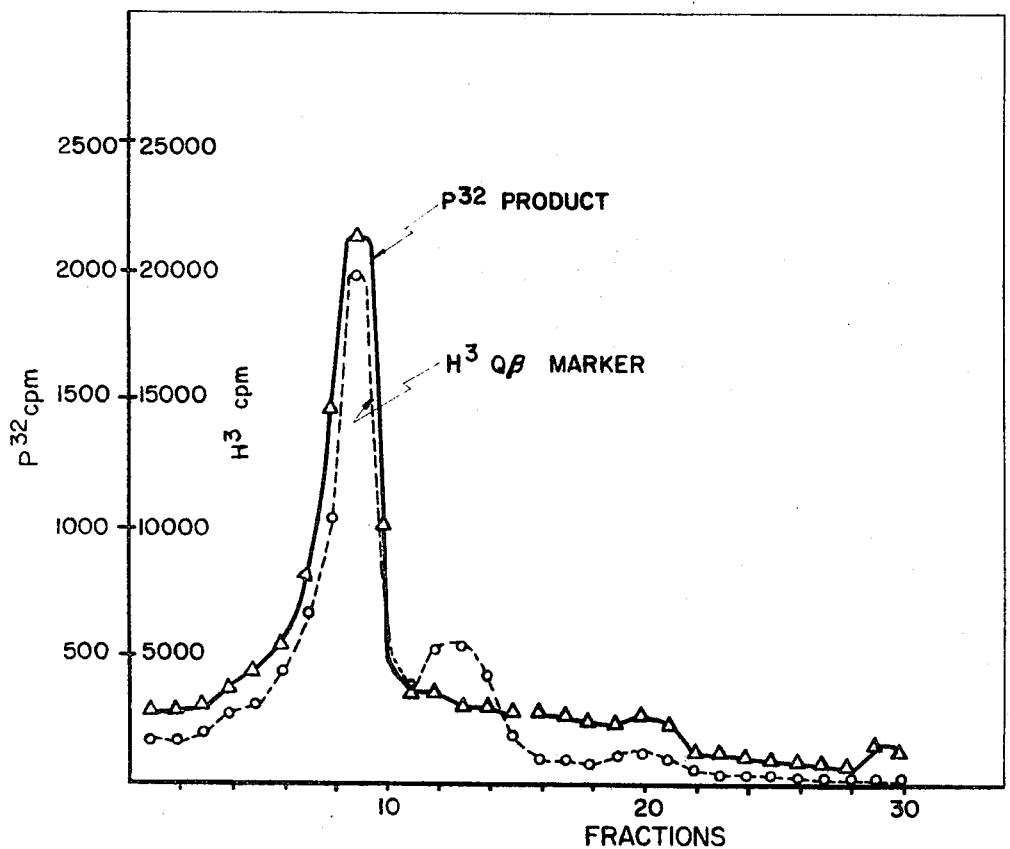
Figure 7:
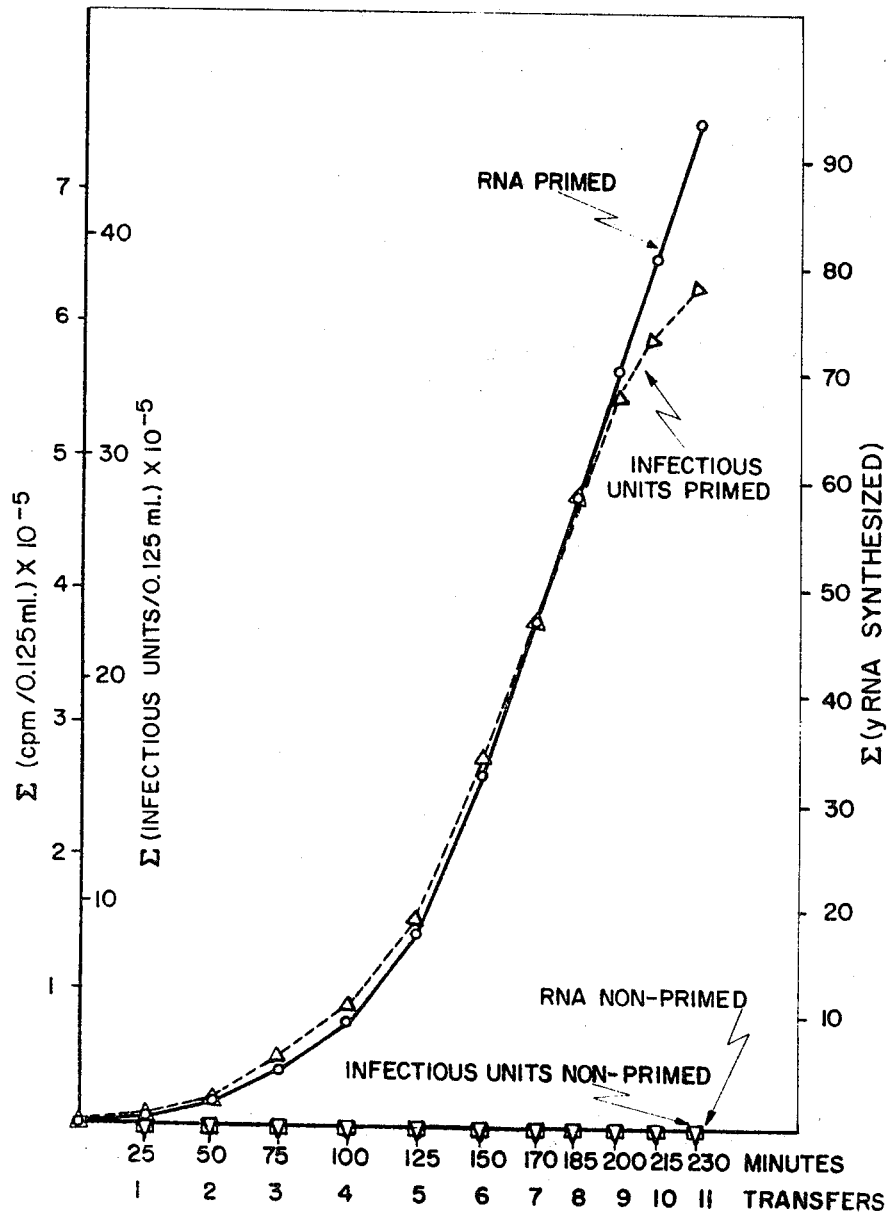

In the accompanying drawings (FIGURES 1–7), data are shown for replicase preparations which have gone through the CsCl and sucrose centrifugation steps only: FIGURE 1 shows the results of banding of enzyme protein in a CsCl gradient; FIGURE 2 shows the comparison of primer response by the replicase before and after CsCl purification; FIGURE 3 shows a comparison of autocatalytic synthesis by the replicase before and after CsCl purification; FIGURE 4 shows the behavior of the replicase during sedimentation in sucrose gradients; FIGURE 5 shows the resolution of replicase and transcriptase in sucrose gradients; FIGURE 6 shows the sedimentation analysis of extensive synthesis by the replicase purified through CsCl and sucrose; and FIGURE 7 shows the synthesis of RNA and infectious units by enzymes purified through CsCl and sucrose centrifugation.

*Pycnographic purification.*—The results of banding the enzyme protein preparation obtained after the first DEAE chromatography step in a CsCl gradient are presented in FIGURE 1. In order to obtain these results, refractive indices were read, and then samples were diluted to 1 ml., and 20λ of each fraction were examined for enzyme activity in the standard reaction mixture; incubation conditions were 30° C. for 30 minutes. Virus particles are found at a density corresponding to 1.41 gm./cm.$^3$. Replicase bands at 1.26 gm./cm.$^3$, somewhat less dense than bulk protein, and is therefore easily separated from the virus band. Approximately $10^{-6}$ of the original phage contamination is retained in the bulk protein peak, and repeated banding of the protein in CsCl failed to reduce the contamination substantially. Presumably the protein precipitate formed in the high concentrations of CsCl acts as an ion exchange surface, with the residual virus contamination representing the adsorption capacity of the precipitate.

After purification in CsCl, the requirement for and response to added Qβ-RNA is retained. However, as is shown in the saturation curves of FIGURE 2, there is a substantial increase in the observed activity of the enzyme following pycnography. In order to obtain these curves, standard reaction mixture contained 50 μg. of enzyme protein; specific activity of triphosphate was $3 \times 10^5$ c.p.m./0.2 μm; incubation conditions were 30° C. for 30 minutes. Since equivalent concentrations of RNA are required to saturate the enzyme, the stimulation observed after CsCl would seem to reflect a more rapid read-out of the template. This implication is borne out by an examination of exponential synthesis during template limitation.

FIGURE 3 is a comparison of autocatalytic synthesis by replicase before and after CsCl purification; the doubling time of RNA is three times that catalyzed by enzyme which was not further purified. In order to obtain this comparison, reactions containing 50 μg. protein and .15 μg. Qβ-RNA in each standard reaction mixture were carried out at 30° C. and aliquots were withdrawn at the indicated time intervals; the specific activity of triphosphates was such that 3,300 c.p.m. corresponded to 1 μg. RNA product in each 0.25 ml.

*Sedimentation purification.*—Protein preparations obtained after banding in CsCl still contain too many virus particles to permit direct assays of reaction products for infectivity. The residual contamination is lowered to acceptable levels by sedimentation of the CsCl-purified enzyme protein through linear gradients of sucrose. FIGURE 4 shows the sedimentation profile of replicase activity, with catalase included as a reference. After 12 hours of centrifugation, infectious virus particles are found as a pellet in the tube. It will be noted that replicase activity sediments as a single peak. Employing catalase (molecular weight, $2.5 \times 10^5$) as a standard, the molecular weight of replicase may be estimated at $1.1 \times 10^5$.

Table 1 summarizes the relevant properties of the replicase preparation at each stage of the purification. More specifically, the recoveries of replicase activity, viral contamination, and relative optical density measurements during a purification are given in Table 1. Quite often, O.D.$^{260}$/O.D.$^{280}$ ratios of post-DEAE enzyme preparations are as high as 1.0. After CsCl and sucrose, however, this is invariably lowered to 0.60, indicating effectiveness of the technique. Also, activity recoveries from CsCl often exceed 100%.

TABLE 1.—PROPERTIES OF REPLICASE AT DIFFERENT STAGES OF PURIFICATION

| Stage | Recovery of replicase activity, percent | Plaque-forming units/mg. protein | O.D.$^{260}$/O.D.$^{280}$ |
|---|---|---|---|
| After first DEAE | (100) | $6.5 \times 10^{11}$ | 0.606 |
| After first DEAE and CsCl | 82 | $4.6 \times 10^5$ | 0.602 |
| After first DEAE, CsCl and Sucrose | 69 | ~50 | 0.604 |

The final residue of phage contamination is such that only 1 to 10 plaque-forming units are introduced into a standard reaction mixture, a level which would not be detected by our usual sampling procedure.

Synthesis routinely involves the appearance of 0.2 to 20γ of new RNA, corresponding to $10^4$ to $10^6$ infectious units per reaction mixture under our assay conditions. The levels of mature phage contamination are clearly far below detectability.

Occasionally some transcriptase (DNA-dependent RNA-polymerase) contaminates the replicase peak eluted from the DEAE column. Rechromatography is recommended when this occurs. However, as FIGURE 5 shows, sedimentation through sucrose gradients can be used to separate replicase from transcriptase. This procedure is also extremely effective in eliminating any remaining traces of RNAase, which remain at the top of the gradient. In obtaining the data for FIGURE 5, centrifugation, collection and assays for replicase are carried out as described above; and in assaying for DNA-dependent activity, 10 μg. calf thymus DNA were substituted for Qβ-RNA in the standard reaction mixture; and from relative sedimentation rates of the two activities, the molecular weight of the transcriptase was estimated at $3 \times 10^5$.

*Synthesis of infectious nucleic acid.*—We have already shown that the response of replicase to template is retained throughout the purification. Further, FIGURE 6 establishes that the product of the purified enzyme possesses a sedimentation pattern similar to Qβ-RNA. In obtaining the sedimentation analysis of FIGURE 6, the standard reaction mixture contains 50 μg. of "purified" enzyme protein and 0.2 μg. of Qβ-RNA; the reaction is continued for 40 minutes at 35° C. during which a 30-fold synthesis occurs. To 0.1 ml. of the reaction mixture were added 0.01 ml. of 20% sodiumdodecylsulphate, 0.005 ml. H$^3$ Qβ-RNA, and 0.20 ml. .01 M tris, pH 7.4; .005 M MgCl$_2$; it was then layered onto a linear gradient of 2.5% to 15% sucrose in 0.01 M tris, pH 7.4; .005 M MgCl$_2$; .1 M NaCl, and centrifuged at 25,000 r.p.m. for 12 hours at 10° C. in the Spinco SW–25 rotor.

As shown in Proc. Nat'l Acad. Sci., U.S., 54, 919 (1965), an enzyme purified through the first DEAE stage provides convincing evidence that RNA synthesized by replicase possesses the biological information characteristic of Qβ. In these experiments, the product of a reaction initiated with Qβ-RNA is serially diluted in successive reactions until the original Qβ-RNA is reduced to an insignificant level. The final tube contains new radioactive RNA which is fully as competent biologically as the viral RNA used to start the reaction in the first tube.

We now offer a similar demonstration showing that replicase further purified through CsCl and sucrose gradients retains unimpaired the ability to generate biologically active copies.

The reaction is initiated at less than primer saturation, and synthesis is allowed to proceed. After a suitable interval, $\frac{1}{12.5}$ of this reaction is used to initiate a second one. Again, after permitting adequate synthesis, the same aliquot of the second tube is employed as the template for a third reaction, and so on for 10 transfers. FIGURE 7 shows the synthesis of RNA and infectious units by purified enzymes. Since the reaction in the first tube is started with $6 \times 10^{10}$ strands (0.1γ) of Qβ-RNA and each transfer involves a $\frac{1}{12.5}$ dilution, the combination of the initiating RNA to the infectious centers measured in the fourth tube is below the level of detectability, and this tube contains 2.4×10⁵ infectious units. Finally, the eleventh reaction contains less than one strand of the initial primer and at the same time shows 2.5×10⁵ infectious units as determined by plaques formed in the protoplast assay. Clearly, the replicase purified by pycnography and sedimentation has retained its ability to produce biologically competent replicas.

In obtaining the data for FIGURE 7, eleven reaction mixtures of .125 ml., each containing 22 μg. of enzyme purified through CsCl and sucrose centrifugation and the other components of the standard reaction mixture were prepared. Specific activity of P³² UTP was such that 8,000 c.p.m. signified 1 μg. RNA product. To the first tube were added 0.1 μg. Qβ-RNA, and the reaction was allowed to proceed for 25 minutes at 35° C., whereupon .02 ml. were withdrawn for counting and .01 ml. used as template for the second reaction. The first tube was then frozen and stored at −70° C. The second reaction product was used to initiate the third and so on. A second series of transfers were carried out in a manner identical to that described, save that no initial RNA template was added to the first reaction mixture. Aliquots of all the reaction mixtures were directly assayed for infectious units as described above. In the case of the control transfer series, samples were diluted ⅒ in TM and then mixed with protoplasts. All other samples were adjusted to 0.2 to 0.8 μg. RNA product/ml. before mixing with protoplasts.

These methods, detailed above, for purification of Qβ replicase yield preparations sufficiently free of virus particles to permit direct assay of the RNA product for biological activity.

We claim:

1. The method of synthesizing in vitro a biologically active intact ribonucleic acid comprising the steps of providing an activated system capable of synthesizing in vitro biologically active ribonucleic acid for prolonged or extensive periods, which system includes biologically active intact ribonucleic acid; the specific replicase for said ribonucleic acid which will recognize the intact ribonucleic acid of its origin and which is free of detectable destructive contaminants and substantially free of vital infectivity; the nucleotide base components adenosine triphosphate, guanosine triphosphate, cytidine triphosphate, and uridine triphosphtae; and divalent magnesium ions as an activating cofactor; and allowing said system to incubate.

2. The method of claim 1 wherein said ribonucleic acid is a viral ribonucleic acid.

3. The method of claim 1 wherein said nucleotide base components are isotopically labeled.

4. The method of claim 1 wherein said synthesized ribonucleic acid is recovered from said system.

5. The method of synthesizing in vitro biologically active, intact ribonucleic acid involving copying the sequence of bases thereof, comprising the steps of providing an activated system in vitro which includes biologically active, homologous, intact ribonucleic acid; the specific replicase for said ribonucleic acid which will recognize the intact ribonucleic acid of its origin and which is free of detectable degrading enzymes, and inhibitors, and substantially free of viral infectivity; the nucleotide base components adenosine triphosphate, guanosine triphosphte, cytidine triphosphate, and uridine triphosphate; and divalent magnesium ions as an activating cofactor; and allowing said system to incubate.

6. The method of claim 5 wherein said synthesized ribonucleic acid is recovered from said system.

7. The method of reproducing biologically active, intact ribonucleic acid in vitro, which method comprises: providing an in vitro, enzymatic, self-duplicating system having (a) biologically active, homologous, intact, ribonucleic acid template, (b) the specific selective active homologous replicase for said ribonucleic acid that has a selective preference for the homologous template and which will recognize the intact ribonucleic acid of its origin, said replicase being effectively free of detectable nuclease activity and destructive enzymological activity, and substantially free of viral infectivity, (c) the nucleotide base components adenosine triphosphate, guanosine triphosphate, cytidine triphosphate, and uridine triphosphate; and (d) divalent magnesium ions as activating cofactors; allowing said system to incubate and recovering biologically active ribonucleic acid produced from said system.

8. The method of claim 7 wherein said ribonucleic acid is a viral ribonucleic acid.

9. The method of claim 7 wherein said ribonucleic acid is ribonucleic acid of bacteriophage Qβ.

10. The method of claim 7 wherein said ribonucleic acid is ribonucleic acid of bacteriophage MS-2.

11. The method of claim 7 wherein said system is significantly free of transcriptase and deoxyribonucleic acid.

12. The method of claim 7 wherein said system includes deoxyribonucleic acid and said replicase includes transcriptase.

13. The method of claim 7 wherein said base components are isotopically labeled.

14. The method of reproducing replicas of intact viral ribonucleic acid free of proteinaceous coating in vitro, which method comprises providing an invitro, enzymatic, self-duplicating system having (a) a biologically active, self-propagating, homologous, intact, viral ribonucleic acid input template free of a protein coating; (b) the active specific replicase for said viral ribonucleic acid that has a selective preference for said template and which will recognize the intact ribonucleic acid of its origin, said replicase being effectively free of detectable nuclease activity and destructive enzymological activity, and substantially free of viral infectivity; (c) the nucleotide base components adenosine triphosphate, guanosine triphosphate, cytidine triphosphate, and uridine triphosphate; and (d) divalent magnesium ions as activating cofactors; and in which the system does not have transcriptase present together with deoxyribonucleic acid; and allowing said system to incubate.

15. The method of claim 14 wherein said replicas are recovered from said system.

16. A replicase for viral RNA, said replicase being effectively free of detectable levels of degrading enzymes and inhibitors, and substantially free of viral infectivity, being able to recognize the intact ribonucleic acid of its origin, and being capable of providing prolonged or extensive synthesis of homologous, intact viral RNA from adenosine triphosphate, guanosine triphosphate, cytidine triphosphate, uridine triphosphate, and magnesium ions.

17. The product of claim 16 wherein the replicase has antigenic properties.

References Cited

Proc. Natl. Acad. Sci., vol. 50, pp. 905–911 (1963).

ALVIN E. TANENHOLTZ, *Primary Examiner.*

U.S. Cl. X.R.

195—1.1, 62, 66; 260—211.5